US010500513B1

(12) United States Patent
Huisman

(10) Patent No.: US 10,500,513 B1
(45) Date of Patent: Dec. 10, 2019

(54) INTERACTIVE SOUND GENERATING TOY

(71) Applicant: TOMY International, Inc., Dyersville, IA (US)

(72) Inventor: Christopher Huisman, Dyersville, IA (US)

(73) Assignee: Tomy International, Inc., Dyersville, IA (US)

( * ) Notice: Subject to any disclaimer, the term of this patent is extended or adjusted under 35 U.S.C. 154(b) by 0 days.

(21) Appl. No.: 16/213,465

(22) Filed: Dec. 7, 2018

(51) Int. Cl.
*A63H 33/00* (2006.01)
*A63H 3/28* (2006.01)
*G11B 20/10* (2006.01)

(52) U.S. Cl.
CPC ......... *A63H 3/28* (2013.01); *G11B 20/10527* (2013.01); *G11B 2020/10546* (2013.01)

(58) Field of Classification Search
CPC ................ A63H 3/28; G11B 20/10527; G11B 2020/10546
USPC ....... 446/175, 297, 299–302, 269, 397, 484, 446/491
See application file for complete search history.

(56) References Cited

U.S. PATENT DOCUMENTS

| | | | | |
|---|---|---|---|---|
| 4,840,602 A * | 6/1989 | Rose | .......................... | A63H 3/28 273/460 |
| 4,857,030 A * | 8/1989 | Rose | .......................... | A63H 3/28 446/303 |
| 4,923,428 A * | 5/1990 | Curran | ...................... | A63H 3/28 434/319 |
| 5,752,880 A * | 5/1998 | Gabai | ..................... | A63H 30/04 434/308 |
| 6,110,000 A * | 8/2000 | Ting | .......................... | A63H 3/28 446/175 |
| 6,309,275 B1 * | 10/2001 | Fong | ......................... | A63H 3/28 446/175 |
| 6,551,165 B2 * | 4/2003 | Smirnov | ................... | A63H 3/28 446/175 |
| 6,729,934 B1 * | 5/2004 | Driscoll | .................... | A63H 3/28 340/10.41 |
| 8,444,452 B2 * | 5/2013 | Dang | ...................... | A63H 13/02 446/397 |
| 2010/0261406 A1 * | 10/2010 | Hornsby | ................ | A63H 17/26 446/457 |
| 2013/0305903 A1 * | 11/2013 | Fong | ........................ | G10H 1/26 84/609 |

* cited by examiner

*Primary Examiner* — Nini F Legesse
(74) *Attorney, Agent, or Firm* — Saul Ewing Arnstein & Lehr LLP

(57) ABSTRACT

The present invention relates generally to a toy system with multiple character units that are adapted to play different recordings, and may include a first character unit and a second character unit. Each character units may include an actuator, a transceiver, and having a plurality of character recordings, and wherein actuation of a character may cause multiple character recordings to be selected and played.

6 Claims, 6 Drawing Sheets

INTERACTIVE SOUND GENERATING TOY

FIELD OF THE INVENTION

This invention relates in general to an interactive sound generating toy for children.

BACKGROUND OF THE INVENTION

Sound generating toys, such as toys that play music, provide children with a fun and stimulating means for play. Such toys can include talking dolls, cars that make engine noises, and any variety of toys that play music. The present invention provides for a novel and interactive toy that allows the child to select sounds to be played, e.g., music, by the toy in a fun and innovative way.

SUMMARY OF THE INVENTION

The present invention relates generally to a toy system with multiple character units that are adapted to play different recordings. In a preferred embodiment, the toy system comprises a first character unit and a second character unit. The character units may include a character and a base. For example, the second character unit may include a second character, such as a dog, and a second base, such as a dog's bowl. Other character units may include characters such as other animals, people, or the like, and bases that preferably relate to the character. For example, a bird character may have a base in the shape of a bird's nest.

The first character unit may comprise a first actuator, a first transceiver, a first memory having a plurality of first character recordings, and a first processor configured to select and play at least one of the plurality of first character recordings. The character recordings may be audio, video, text, or a combination thereof. Similar to the first character unit, the second character unit may comprise a second actuator, a second transceiver, a second memory having a plurality of second character recordings, and a second processor configured to select and play at least one of the second character recordings. Each of the first transceiver and the second transceiver are configured to communicate with one another. The communication protocol that may be used can be any wired or wireless communication protocol, such as RF, Bluetooth, IR, or the like.

In one preferred embodiment, the first character recordings include at least an "A" track and a "B" track. The "A" track comprises a first character likeness related to the first character, and the "B" track comprises a first character likeness related to the second character. A character likeness relates to a characteristic of the character or is representative of the character, such as its voice, sound, or image. For example, a character likeness may include the voice of a dog character. The reference of a track being related to a character means that the track pertains to the identified character. For example, track "B" may relate to a second character, e.g., a cow, such that track "B" is the cow's song. By the same token, track "A" may be related to the first character, e.g., a dog, such that track "A" is the dog's song. In this example, the "A" track could be the dog's song sung in the dog's voice, and the "B" track could be the cow's song sung in the dog's voice.

In this preferred embodiment, the second character recordings include at least a "C" track and a "D" track. Similar to the first character unit, the "C" track comprises a second character likeness related to the first character, and the "D" track comprises a second character likeness related to the second character. In the example of the first character as a dog and the second character as a cow, the "C" track would be the dog's song sung in the cow's voice, and the "D" track would be the cow's song sung in the cow's voice.

When the first actuator is actuated, the first transceiver transmits a first actuator signal to the second transceiver. Actuation of the first actuator also results in the first processor selecting and playing the "A" track. The second processor also selects and plays the "C" track after the second transceiver receives the first actuator signal. It should be understood that the first processor may first select and play the "A" track and then transmit the first actuator signal, or vice versa, or perform each action simultaneously. The selection and playing of the tracks may be configured so that the tracks are synchronized. In the example given, when the first actuator is actuated, the "dog" character unit selects and plays the dog's song sung in the dog's voice, and the "cow" character unit receives the first actuator signal and selects and plays the dog's song sung in the cow's voice, i.e., the character's sing the dog's song together, but in their own respective voices. When the second actuator is actuated, the second transceiver transmits a second actuator signal to the first transceiver and the second processor selects and plays the "D" track, and the first processor selects and plays the "B" track after the first transceiver receives the second actuator signal. In the example given, when the second actuator is actuated, the "cow" character unit selects and plays the cow's song sung in the cow's voice, and the "dog" character unit receives the second actuator signal and selects and plays the cow's song sung in the dog's voice. The actuators may take many forms. For example, the actuator may include a button on either the character or the base, or may involve the pressing down on the character within the base. While the example given describes the singing of a character's song by both character units in unison, the actuation of a character unit can play the characters' songs in a round, or may have the characters sing different parts of the song, or may include dialog between the characters.

In another preferred embodiment, the toy system may include a third character unit in addition to the first and second character units. As with the other character units, the third character unit comprises a character and a base. The third character unit further includes a third actuator, a third transceiver, a third memory having a plurality of third character recordings, and a third processor configured to select and play at least one of the plurality of third character recordings, wherein each of the third character recordings has a third character likeness and includes an "E" track, an "F" track, and a "G" track. The "E" track is related to the first character, the "F" track is related to the second character, and the "G" track is related to the third character. Continuing with the previous embodiment where the first character is a dog and the second character is a cow, the third character may be a chick. The first transceiver, the second transceiver, and the third transceiver are in communication with one another. In this embodiment, the first character recordings would further include an "H" track having a first character likeness related to the third character, and the second character recordings would further include an "I" track having a second character likeness related to the third character.

In this example, when the first actuator is actuated, the first transceiver transmits the first actuator signal to the second transceiver and the third transceiver, the first processor selects and plays the "A" track, the second processor selects and plays the "C" track after the second transceiver receives the first actuator signal, and the third processor selects and plays the "E" track after the second transceiver receives the first actuator signal. As discussed previously, it should be understood that the selection and playing of a track and the transmission of an actuator signal can be in any order or simultaneous. Using the dog, cow, and chick as example, when the dog actuator is actuated, the dog character unit plays the dog's song sung in the dog's voice, the cow character unit plays the dog's song sung in the cow's voice, and the chick plays the dog's song sung in the chick's voice.

When the second actuator is actuated, the second transceiver transmits the second actuator signal to the first transceiver and the third transceiver, the second processor selects and plays the "D" track, the first processor selects and plays the "B" track after the first transceiver receives the second actuator signal, and the third processor selects and plays the "F" track after the third transceiver receives the second actuator signal. Referring again to the dog, cow, and chick example, when the cow actuator is actuated, the dog character unit plays the cow's song sung in the dog's voice, the cow character unit plays the cow's song sung in the cow's voice, and the chick plays the cow's song sung in the chick's voice.

When the third actuator is actuated, the third transceiver transmits a third actuator signal to the first transceiver and the second transceiver, the third processor selects and plays the "E" track, the first processor selects and plays the "H" track after the first transceiver receives the third actuator signal, and the second processor selects and plays the "I" track after the second transceiver receives the third actuator signal. Referring again to the dog, cow, and chick example, when the chick actuator is actuated, the dog character unit plays the chick's song sung in the dog's voice, the cow character unit plays the chick's song sung in the cow's voice, and the chick plays the chick's song sung in the chick's voice. As before, in example given the singing of a character's song by both character units are in unison, but they may be played in any manner desired.

The number of character units is not limited to two or three. The character units may include recordings for any number of other characters. For example, a particular character may have recordings for several characters such that different characters can be used with other characters.

In yet another embodiment, the toy system may include a plurality of characters that share a base unit. In this embodiment, each character would include an actuator and a transceiver. In this embodiment, either the individual characters or the base unit would include a processor, and a memory comprising a plurality of character recordings. As with the previous embodiments, the character recordings are assigned to particular characters, and the recordings to be selected and played depend on which character is actuated. For example, if a first character is a dog, a second character is a cow, and a third character is a chick, the base unit may be a farm setting. The actuation of the dog character actuator would result in the first transceiver transmitting a first actuator signal to a base transceiver, such that recordings of dog's song sung in the dog's voice, the dog's song sung in the cow's voice, and the dog's song sung in the chick's voice are selected and played.

There has thus been outlined, rather broadly, certain features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE PREFERRED EMBODIMENTS

Before the preferred embodiments of the present invention are described, it is to be understood that the claimed apparatus is not limited to specific embodiments discussed, specific components, or to particular implementations. It is also to be understood that the terminology used herein is for the purpose of describing particular embodiments only and is not intended to be limiting.

Figure 1:
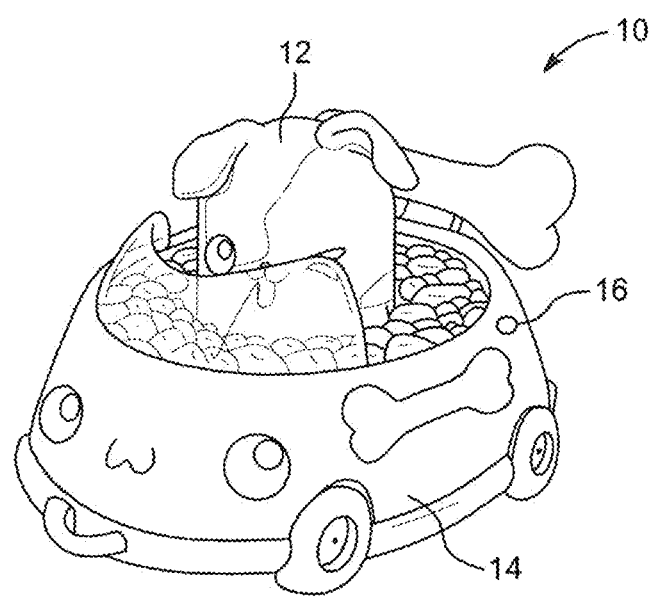
FIG. 1 is a perspective view of a first character unit according to a preferred embodiment of the present invention.
Figure 2:
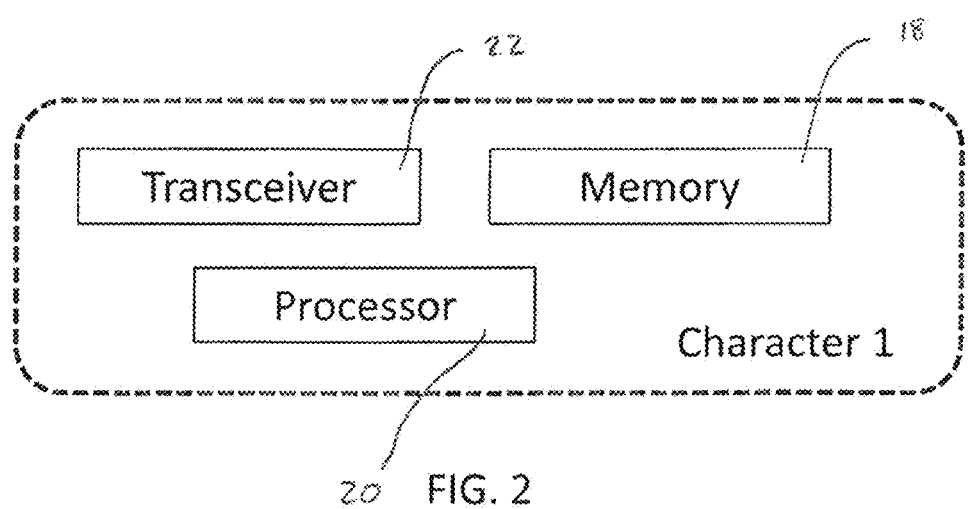
FIG. 2 is a schematic view of components of the first character unit.

A first character unit 10 is discussed with respect to FIG. 1. The first character unit 10 includes a character 12 and a base 14. The first character unit includes a first actuator, which in this embodiment is shown as a button 16 on character 12. It should be understood that the actuator 16 may alternatively located on the base 14. Referring to FIG. 2, character 12 includes a first memory 18 having a plurality of first character recordings, a first processor 20 configured to select and play at least one of the plurality of first character recordings, and a first transceiver 22. In this embodiment, the character recordings are audio tracks, and specifically songs.

Figure 3:
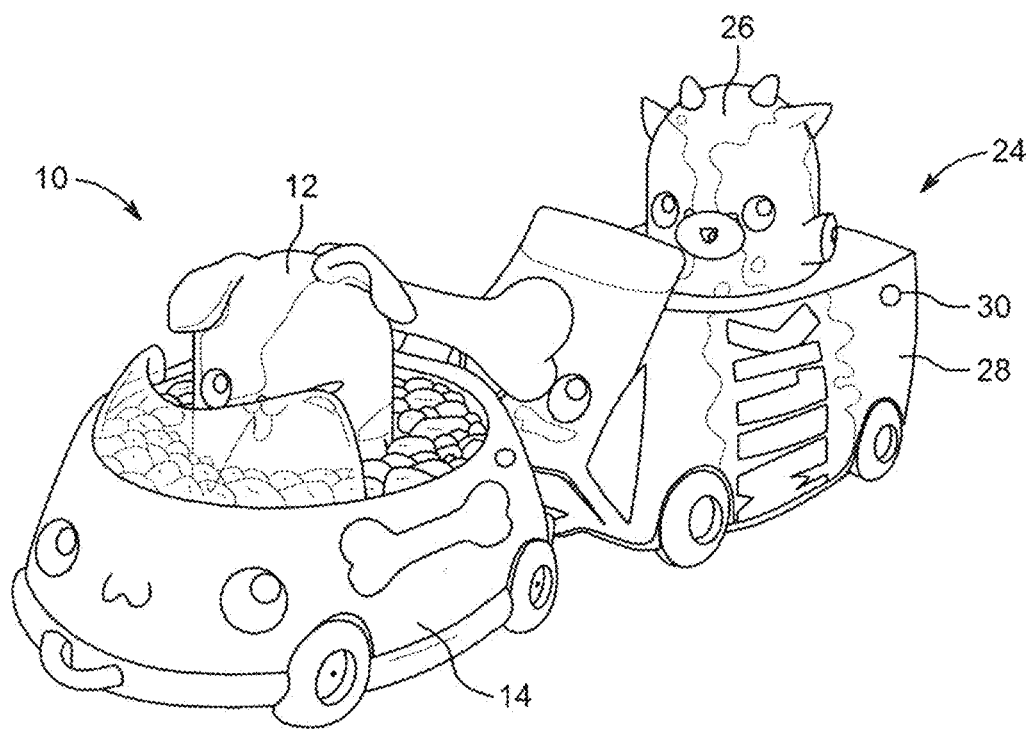
FIG. 3 is a perspective view of a first character unit and a second character unit according to a preferred embodiment of the present invention.
Figure 4:
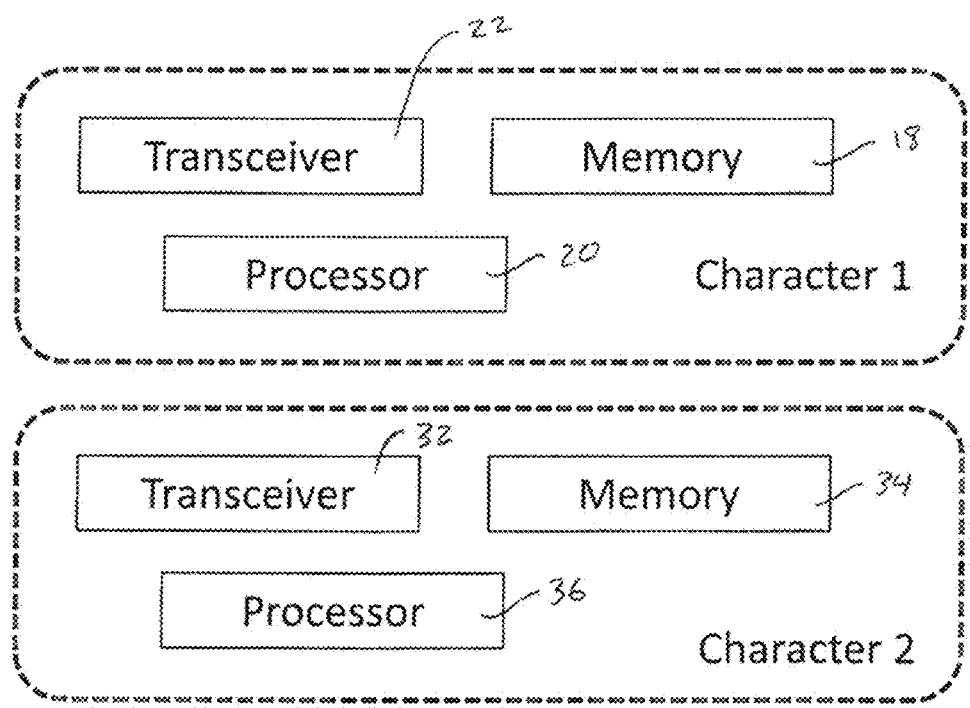
FIG. 4 is a schematic view of components of the second character unit.

Referring to FIGS. 3 and 4, the first character unit 10 with character 12 and base 14 are shown with a second character unit 24 including a second character 26 and a second base 28. The second character unit 22 may comprise a second actuator, such as button 30, a second transceiver 32, a second memory 34 having a plurality of second character recordings, and a second processor 36 configured to select and play at least one of the second character recordings. In this embodiment, the first transceiver 22 and the second transceiver 32 are configured to communicate with one another by any suitable transmission protocol, e.g., RF, Bluetooth, or IR.

In this embodiment, the first character recordings include at least an "A" track and a "B" track. The "A" track comprises a first character likeness related to the first character, and the "B" track comprises a first character likeness related to the second character. In this particular embodiment where first character unit 10 includes a dog character 12 and a dog food bowl base 14, and the second character unit 24 includes a cow character 26 and a milk carton base 28, track "B" is the cow's song sung in the dog's voice and track "A" is the dog's song sung in the dog's voice. The second character recordings, which include at least a "C" track and a "D" track, are the dog's song sung in the cow's voice, and the cow's song sung in the cow's voice, respectively.

Figure 5:
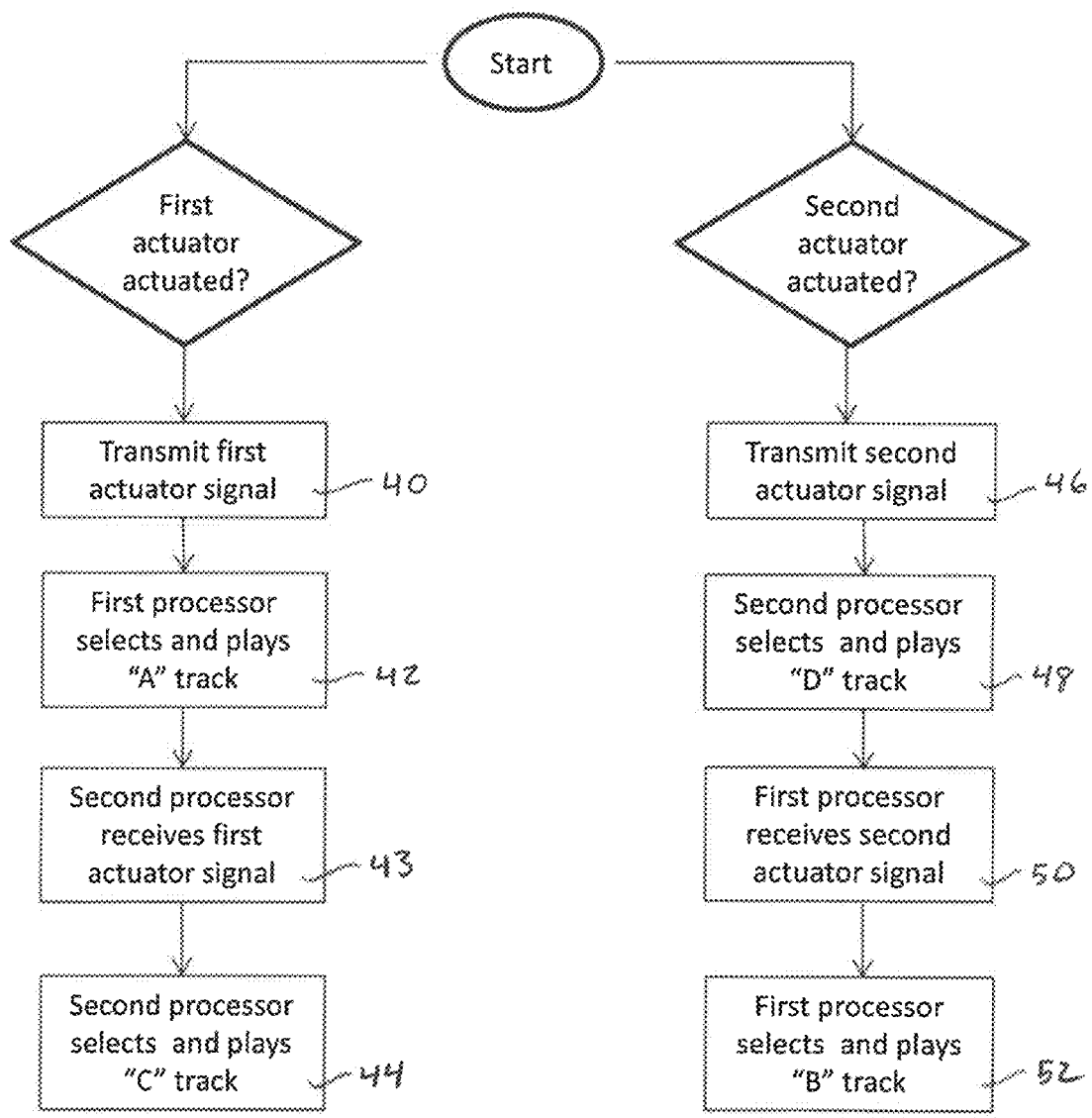
FIG. 5 is a flowchart showing operation of the preferred embodiment of FIG. 2.

Referring to FIG. 5, when the first actuator, such as button 16 (FIG. 3) is actuated, the first transceiver 22 (FIG. 2) transmits a first actuator signal to the second transceiver (FIG. 4) (box 40). Actuation of the first actuator also results in the first processor 20 selecting and playing the "A" track (box 42). The second processor 36 also selects and plays the "C" track (box 44) after the second transceiver 32 receives the first actuator signal (box 43). The selection and playing of the tracks may be configured so that the tracks are synchronized. In the example given, when the first actuator is actuated, the "dog" character unit selects and plays the dog's song sung in the dog's voice, and the "cow" character unit receives the first actuator signal and selects and plays the dog's song sung in the cow's voice, i.e., the character's sing the dog's song together, but in their own respective voices. When the second actuator 30 is actuated, the second transceiver transmits a second actuator signal to the first transceiver (box 46) and the second processor selects and plays the "D" track (box 48), and the first processor selects and plays the "B" track (box 52) after the first transceiver receives the second actuator signal (box 50). In the example given, when the second actuator is actuated, the "cow" character unit selects and plays the cow's song sung in the cow's voice, and the "dog" character unit receives the second actuator signal and selects and plays the cow's song sung in the dog's voice.

Figure 6:
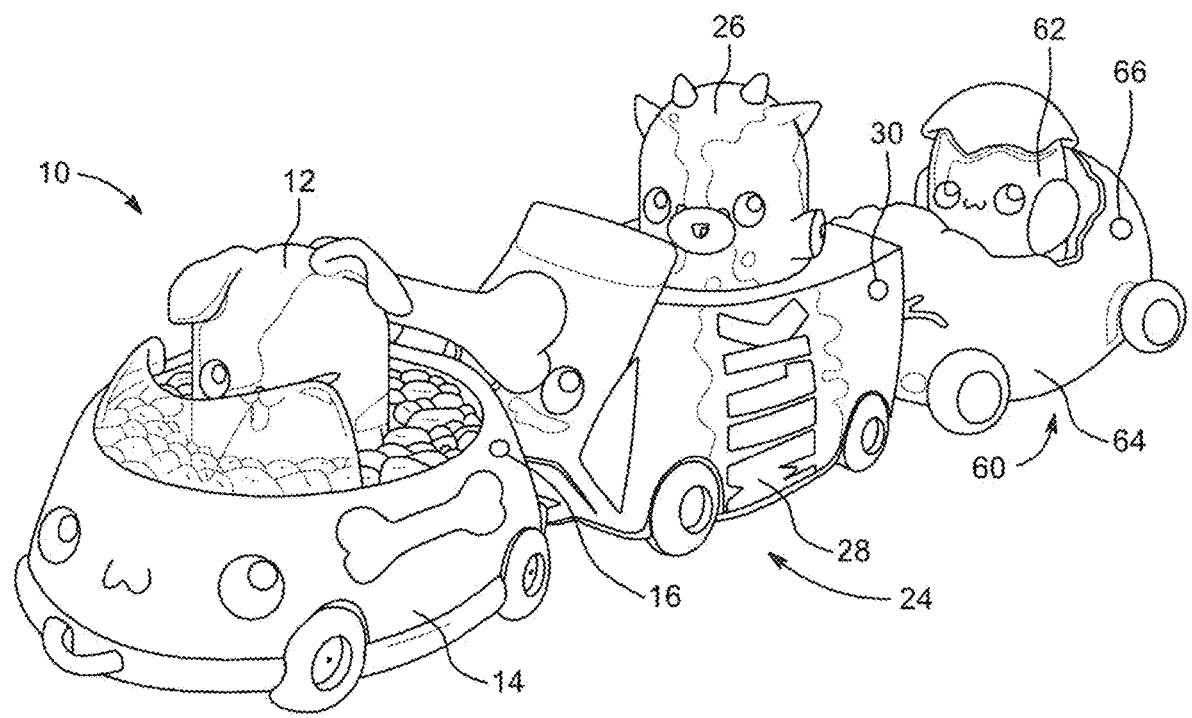
FIG. 6 is a perspective view of an alternative preferred embodiment of the present invention including a first character unit, a second character unit, and a third character unit.
Figure 7:
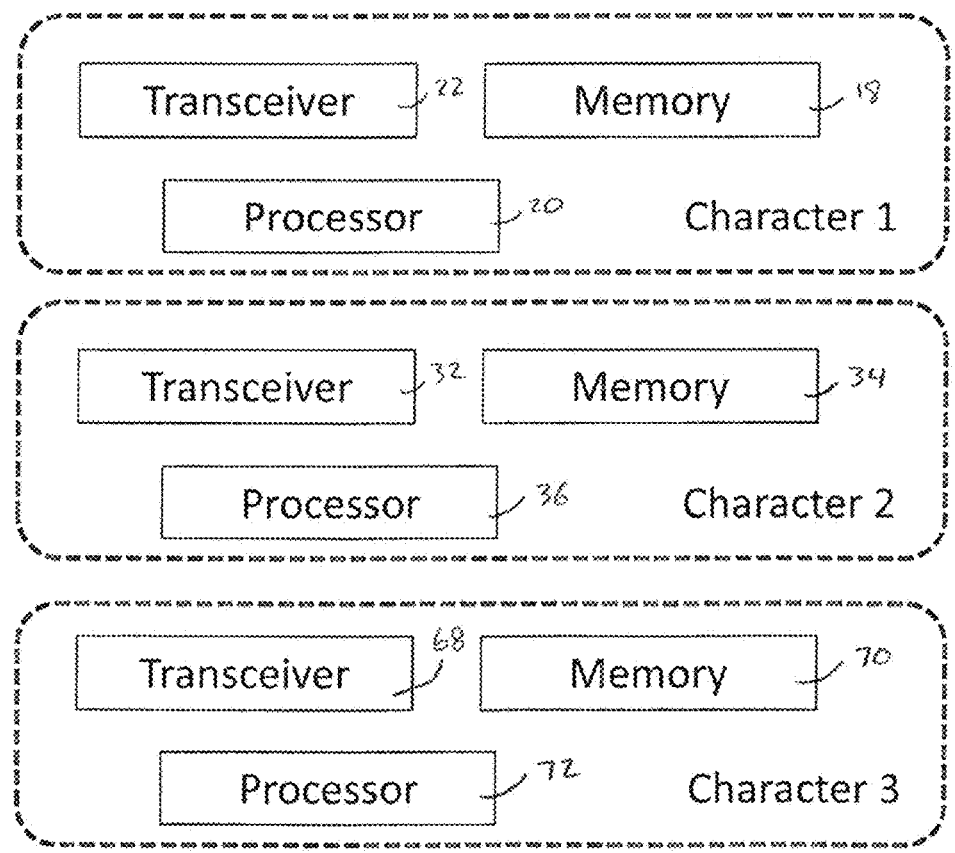
FIG. 7 is a schematic view of components of the third character unit.
Figure 8:
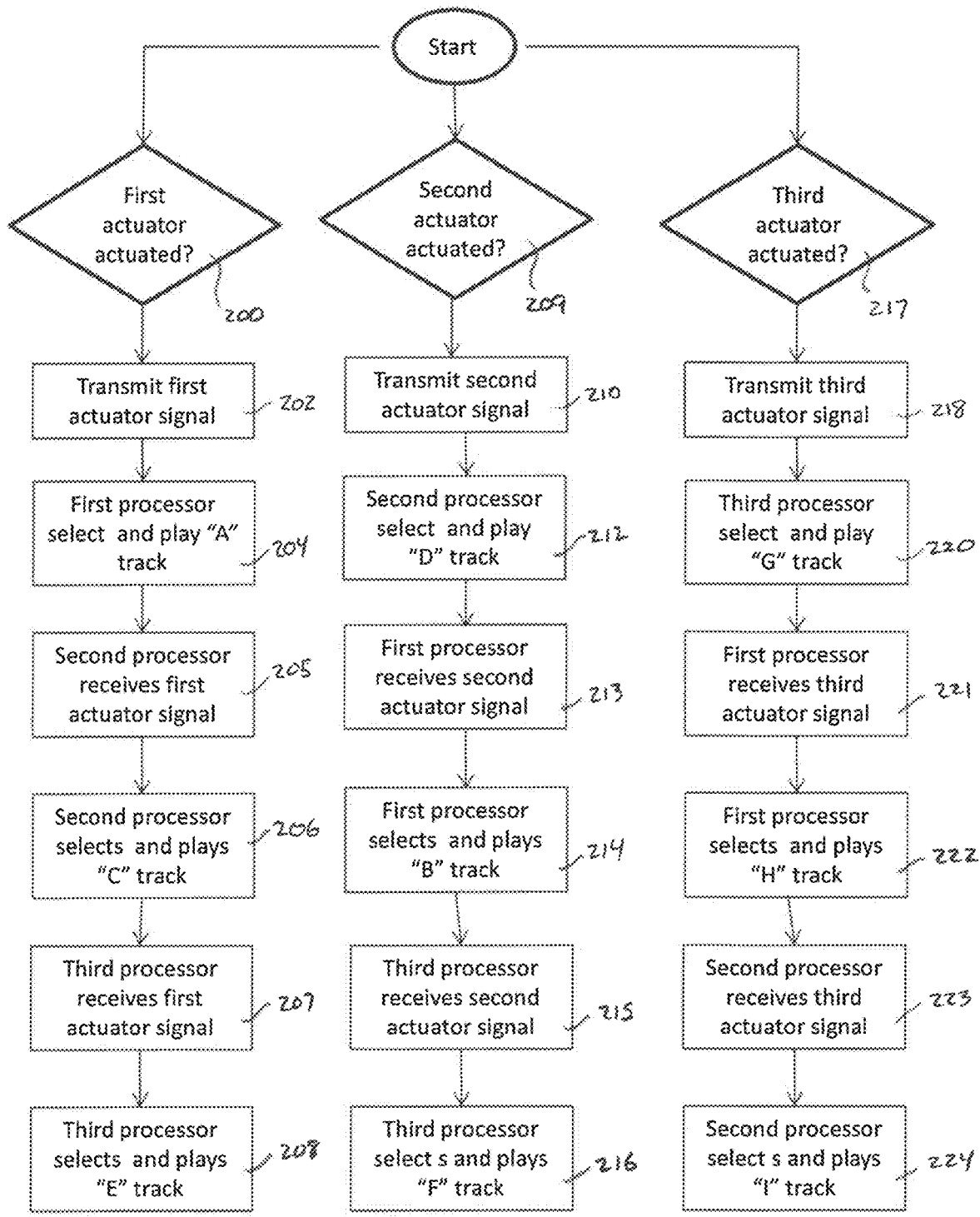
FIG. 8 is a flowchart showing use of the preferred embodiment of FIG. 6.

Referring to FIGS. 6-8, another preferred embodiment is discussed. In this embodiment, the toy system includes a third character unit 60 in addition to the first character unit 10 and second character unit 24. The third character unit 60 comprises a character 62 and a base 64. The third character unit 60 further includes a third actuator 66, a third transceiver 68, a third memory having a plurality of third character recordings 70, and a third processor 72 configured to select and play at least one of the plurality of third character recordings. Each of the third character recordings has a third character likeness and include an "E" track, an "F" track, and a "G" track. The "E" track is related to the first character, the "F" track is related to the second character, and the "G" track is related to the third character. Continuing with the previous embodiment where the first character 12 is a dog and the second character 26 is a cow, the third character 74 may be a chick. The first transceiver 22, the second transceiver 32, and the third transceiver 76 are in communication with one another. In this embodiment, the first character recordings would further include an "H" track having a first character likeness related to the third character, and the second character recordings would further include an "I" track having a second character likeness related to the third character.

In this example, when the first actuator 16 is actuated (box 200), the first transceiver 22 transmits the first actuator signal to the second transceiver 32 and the third transceiver 76 (box 202), the first processor 20 selects and plays the "A" track (box 204), the second processor 36 selects and plays the "C" track (box 206) after the second transceiver 32 receives the first actuator signal (box 205), and the third processor selects and plays the "E" track (box 207) after the second transceiver 32 receives the first actuator signal (box 208). Using the dog, cow, and chick as example, when the dog actuator is actuated, the dog character unit plays the dog's song sung in the dog's voice, the cow character unit plays the dog's song sung in the cow's voice, and the chick plays the dog's song sung in the chick's voice.

When the second actuator 30 is actuated (box 209), the second transceiver 32 transmits the second actuator signal to the first transceiver 22 and the third transceiver 76 (box 210), the second processor 36 selects and plays the "D" track (box 212), the first processor selects and plays the "B" track (box 213) after the first transceiver receives the second actuator signal (box 214), and the third processor 72 selects and plays the "F" track (box 216) after the third transceiver receives the second actuator signal (box 215). Referring again to the dog, cow, and chick example, when the cow actuator is actuated, the dog character unit plays the cow's song sung in the dog's voice, the cow character unit plays the cow's song sung in the cow's voice, and the chick plays the cow's song sung in the chick's voice.

When the third actuator 66 is actuated (box 217), the third transceiver 76 transmits a third actuator signal to the first transceiver 22 and the second transceiver 32 (box 218), the third processor 72 selects and plays the "G" track (box 220), the first processor 20 selects and plays the "H" track (box 222) after the first transceiver receives the third actuator signal (box 221), and the second processor 36 selects and plays the "I" track (box 223) after the second transceiver receives the third actuator signal (box 224). Referring again to the dog, cow, and chick example, when the chick actuator is actuated, the dog character unit plays the chick's song sung in the dog's voice, the cow character unit plays the chick's song sung in the cow's voice, and the chick plays the chick's song sung in the chick's voice. As before, in example given the singing of a character's song by both character units are in unison, but they may be played in any manner desired.

Figure 9:
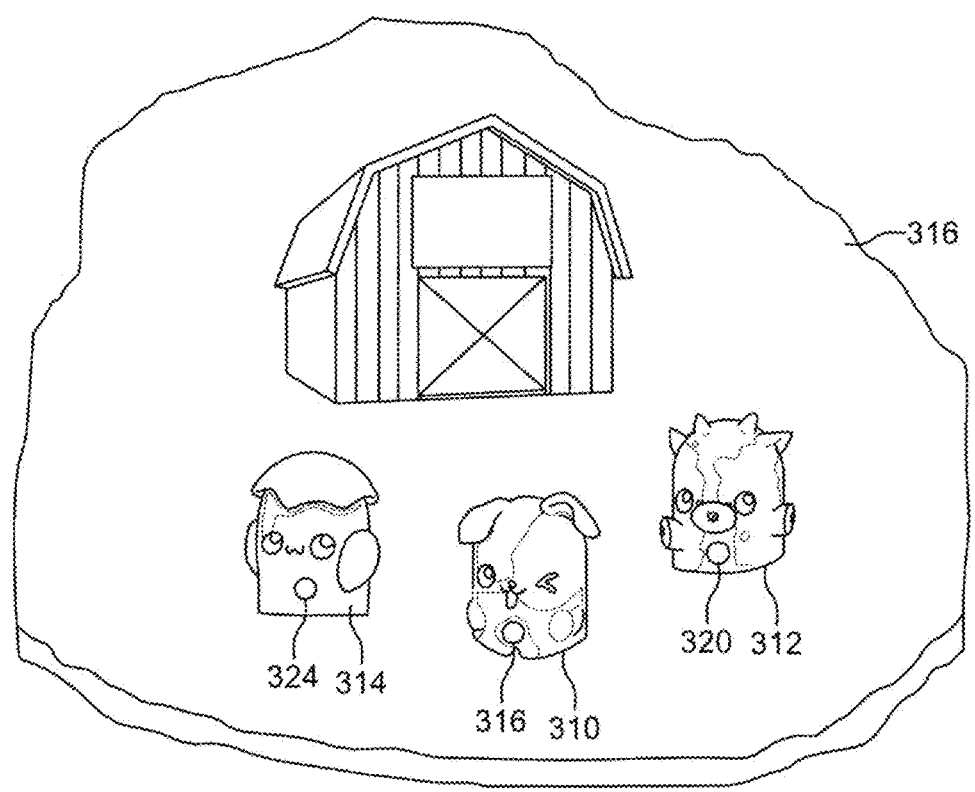
FIG. 9 is a perspective view of a second alternative preferred embodiment of the present invention including a first character, a second character, a third character, and a base unit.
Figure 10:
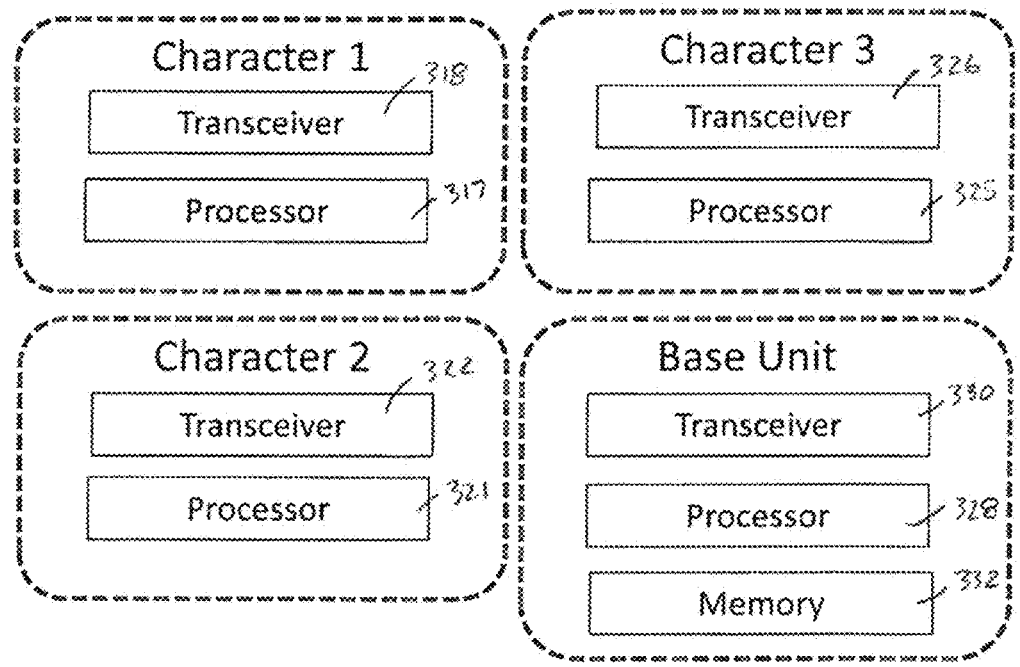
FIG. 10 is a schematic view of components of the first character, the second character, the third character, and the base unit according to FIG. 9.

In yet another embodiment, referring to FIGS. 9 and 10, the toy system may include a plurality of characters, such as first character 310, second character 312, and third character 314, as well as a base unit 316. In this embodiment, each character would include an actuator, processor, and a transceiver. For example, first character 310 would include first actuator 316, first processor 317, and first transceiver 318, second character 312 would include second actuator 320, second processor 321, and second transceiver 322, and third character 314 would include third actuator 324, third processor 325, and third transceiver 326. In this embodiment, base unit 316 includes a base unit processor 328, a base unit transceiver 330, and a memory 332 comprising a plurality of recordings for each of the first character 310, second character 312, and third character 314. As with the previous embodiments, the character recordings are assigned to particular characters, and the recordings to be selected and played depend on which character is actuated. For example, if a first character is a dog, a second character is a cow, and a third character is a chick, the base unit may be a farm setting. The actuation of the dog character actuator would result in the first transceiver transmitting a first actuator signal to the second transceiver (cow's transceiver) and the third transceiver (chick's transceiver), such that the dog character plays the dog's song sung in the dog's voice, the cow character plays the dog's song sung in the cow's voice, and the chick plays the dog's song sung in the chick's voice.

Having described this invention in detail, those skilled in the art will appreciate that numerous modifications may be made of this invention without departing from the spirit of the invention. Therefore, it is not intended that the breadth of the invention be limited to the specific embodiments illustrated and described. Rather, the scope of the invention is to be determined by appended claims and their equivalents.

What is claimed is:

1. A toy comprising:
   a first character unit comprising a first character and a first base, and a second character unit comprising a second character and a second base,
   the first character unit further comprising a first actuator, a first transceiver, a first memory, the first memory having stored therein a plurality of first character recordings, and a first processor configured to select and play at least one of the plurality of first character recordings;
   the second character unit further comprising a second actuator, a second transceiver, a second memory, the second memory having stored therein a plurality of second character recordings, and a second processor configured to select and play at least one of the second character recordings;
   each of the first transceiver and the second transceiver in communication with one another;
   the first character recordings including an "A" track and a "B" track, the "A" track comprising a first character likeness related to the first character, the "B" track comprising a first character likeness related to the second character;
   the second character recordings including at "C" track and a "D" track, the "C" track comprising a second character likeness related to the first character, the "D" track comprising a second character likeness related to the second character;
   the first processor further configured to cause the first transceiver to transmit a first actuator signal to the second transceiver and to select and play the "A" track after actuation of the first actuator,
   the second transceiver adapted to receive the first actuator signal, and the second processor further configured to select and play the "C" track after the second transceiver receives the first actuator signal, and wherein the first processor and the second processor are configured to commence play of the "A" track and the "C" track substantially simultaneously; and
   the second processor further configured to cause the second transceiver to transmit a second actuation signal to the first transceiver and to select and play the "D" track after actuation of the second actuator,
   the first transceiver adapted to receive the second actuation signal, and the first processor further configured to select and play the "B" track after the first transceiver receives the second actuator signal, and wherein the first processor and the second processor are configured to commence play of the "B" track and the "D" track substantially simultaneously.

2. The toy of claim 1, further comprising a third character unit comprising a third character and a third base, a third actuator, a third transceiver, a third memory, the third memory having stored therein a plurality of third character recordings including an "E" track, an "F" track, and a "G" track, the "E" track related to the first character, the "F" track related to the second character, the "G" track related to the third character, each of the third character recordings having a third character likeness, and a third processor, the third processor configured to select and play at least one of the plurality of third character recordings;
   the first transceiver, the second transceiver, and the third transceiver in communication with one another;
   the first memory further including stored therein first character recordings further comprising an "H" track having a first character likeness related to the third character;
   the second memory further including stored therein second character recordings further comprising an "I" track having a second character likeness related to the third character;
   the first processor further configured to cause the first transceiver to transmit the first actuator signal to the second transceiver and the third transceiver after the first actuator is actuated, the first processor further configured to select and play the "A" track, the second processor further configured to select and play the "C" track after the second transceiver receives the first actuator signal, and the third processor further configured to select and play selects and plays the "E" track after the third transceiver receives the first actuator signal, wherein the first processor, the second processor, and the third processor are configured to commence play of the "A" track, the "C" track, and the "E" track substantially simultaneously;
   the second processor further configured to cause the second transceiver to transmit the second actuator signal to the first transceiver and the third transceiver after the second actuator is actuated, the second processor further configured to select and play the "D" track, the first processor further configured to select and play the "B" track after the first transceiver receives the second actuator signal, and the third processor further configured to select and play the "F" track after the third transceiver receives the second actuator signal, and wherein the first processor, the second processor, and the third processor are configured to commence play of the "B" track, the "D" track, and the "F" track substantially simultaneously; and
   the third processor further configured to cause the third transceiver to transmit a third actuator signal to the first transceiver and the second transceiver after the third actuator is actuated, the third processor further configured to select and play the "G" track, the first processor further configured to select and play the "H" track after the first transceiver receives the third actuator signal, and the second processor further configured to select and play the "I" track after the second transceiver receives the third actuator signal, and wherein the first processor, the second processor, and the third processor are configured to commence play of the "G" track, the "H" track, and the "I" track substantially simultaneously.

3. The toy of claim 1 wherein the first character recordings and the second character recordings are songs.

4. A toy comprising:
a first character, a second character, and a base,
the first character further comprising a first actuator, a first transceiver, and a first processor;
the second character further comprising a second actuator, a second transceiver, and a second processor;
the base comprising a base transceiver, a base processor, and a base memory, the base memory having stored therein a plurality of first character recordings and a plurality of second character recordings;
each of the first transceiver and the second transceiver in communication with one another;
the first character recordings including an "A" track and a "B" track, the "A" track comprising a first character likeness related to the first character, the "B" track comprising a first character likeness related to the second character;
the second character recordings including at "C" track and a "D" track, the "C" track comprising a second character likeness related to the first character, the "D" track comprising a second character likeness related to the second character;
the base processor configured to cause the first transceiver to transmit a first actuator signal to the base transceiver and the base processor further configured to select and play the "A" track and the "C" track after the first actuator is actuated and such that play of the "A" track and the "C" track are commenced at substantially the same time; and
the base processor configured to cause the second transceiver to transmit a second actuator signal to the base transceiver and the base processor further configured to select and play the "D" track and the "B" track after the second actuator is actuated and such that play of the "B" track and the "D" track are commenced at substantially the same time.

5. The toy of claim 4, further comprising a third character having a third transceiver and a third processor, the base memory further having stored therein a plurality of third character recordings including an "E" track, an "F" track, and a "G" track, the "E" track related to the first character, the "F" track related to the second character, the "G" track related to the third character;
the base memory further having stored therein an "H" track having a first character likeness related to the third character and
an "I" track having a second character likeness related to the third character;
the base processor further configured to cause the first transceiver to transmit the first actuator signal to the base transceiver after the first actuator is actuated, and the base processor is further configured to select and to commence play of the "A" track, the "C" track and the "E" track at substantially the same time;
the base processor further configured to cause the second transceiver to transmit the second actuator signal to the base transceiver after the second actuator is actuated, and the base processor is further configured to select and to commence play of the "D" track, the "B" track, and the "F" track at substantially the same time; and
the base processor further configured to cause the third transceiver to transmit a third actuator signal to the base transceiver after the third actuator is actuated, and the base processor is further configured to select the "G" track, the "H" track, and the "I" track and to commence play of the "G" track, the "H" track, and the "I" track at substantially the same time.

6. A play toy comprising:
a plurality of character units, each character unit comprising an actuator, a transceiver, a memory, and a programmed processor, the plurality of character units comprising a first character unit and at least one second character unit;
the first character unit memory having stored therein a first character recording comprising a first character likeness related to the first character unit;
each of the at least one second character unit memories having stored therein a second character recording related to the first character unit;
the first character unit actuator configured to cause generation of a first actuator actuation signal;
each of the at least one second character unit transceivers configured to receive the first actuator actuation signal;
each of the at least one second character unit processors configured to select the second character recording and play the second character recording after receiving the first actuator actuation signal;
the first character unit processor configured to play the first character recording after generation of the first actuator actuation signal; and
the first character unit processor and each of the at least one second character unit processors configured to commence playing of the first character recording and the second character recording at substantially the same time.

* * * * *